United States Patent [19]

Chao et al.

[11] Patent Number: 5,109,030
[45] Date of Patent: Apr. 28, 1992

[54] FOAMED HYDRAULIC COMPOSITIONS CONTAINING COPOLYMERIC FOAM STABILIZERS

[75] Inventors: Yen-Yau H. Chao, Harleysville; Gary R. Larson, Hatfield; Linus W. Linder, Lansdale, all of Pa.; Mike J. Bauman, Mundelein, Ill.

[73] Assignee: Rohm and Haas Company, Philadelphia, Pa.

[21] Appl. No.: 746,078

[22] Filed: Aug. 12, 1991

Related U.S. Application Data

[63] Continuation of Ser. No. 441,028, Nov. 22, 1989, abandoned.

[51] Int. Cl.$^5$ .............................................. C08J 9/06
[52] U.S. Cl. ...................................... 521/83; 521/149
[58] Field of Search ............................................ 521/83

[56] References Cited

U.S. PATENT DOCUMENTS

| | | | |
|---|---|---|---|
| 4,473,406 | 9/1984 | Bradley et al. | 106/90 |
| 4,792,360 | 12/1988 | Pierce et al. | 106/90 |
| 4,804,688 | 2/1989 | Vassileff | 521/83 |

*Primary Examiner*—Morton Foelak
*Assistant Examiner*—John M. Cooney, Jr.

[57] ABSTRACT

An improved foamed hydraulic composition comprising at least one hydraulic substance, from about 20 to about 130 parts water, and from about 0.01-30 parts of a copolymeric foam stabilizer based on 100 parts hydraulic substance, where the copolymeric foam stabilizer is formed from one or more non-ionic, ethylenically-unsaturated monomers and one or more ionic or ionizable ethylenically-unsaturated monomers containing carboxylic acid.

36 Claims, No Drawings

FOAMED HYDRAULIC COMPOSITIONS CONTAINING COPOLYMERIC FOAM STABILIZERS

This application is a continuation of application Ser. No. 441,028, filed Nov. 22, 1989, now abandoned.

FIELD OF THE INVENTION

This invention relates to an improved foamed hydraulic composition, and more particularly to lightweight, foamed cementitous and gypsum compositions containing a copolymeric foam stabilizer.

BACKGROUND OF THE INVENTION

There are a variety of compositions and processes to make precast and cast-in-place lightweight hydraulic articles. Some of these use lightweight fillers and aggregates to achieve lightweight. Some reduce their density by filling the inorganic body with tiny gas bubbles. There are many ways to make lightweight hydraulic articles containing gas bubbles. One of the most common methods is aeration. Aeration can be done mechanically by foaming a freshly prepared cement or gypsum slurry containing a foaming agent and a foam stabilizer. Another way to aerate cement or gypsum is to add a pre-generated organic foam into the slurry.

To generate lightweight cement or gypsum with good texture and mechanical performance by the aeration of conventional cement or gypsum is generally difficult. This is due, in the case of cement, to the bubble collapse in the slow hardening process after hydration. Yet another cause for the collapse of cement and gypsum bubbles is the incompatibility between the organic prefoam component and the inorganic slurry component. This latter collapse usually takes place immediately after the contact of the prefoam with the slurry.

DESCRIPTION OF THE PRIOR ART

U.S. Pat. Nos. 4,113,913; 4,441,944 and 4,559,263 describe foamed cementitious products using high levels of polymers to enhance mechanical strength.

U.S. Pat. No. 4,731,389 discloses the stabilization of cementitious foam by the interaction between a polyvinyl alcohol modifier and a salt additive such as sodium metaborate.

U.S. Pat. No. 3,867,159 describes the formation of lightweight concrete using low levels of water soluble polymeric resin binder with a proteinaceous foaming agent.

U.S. Pat. No. 3,834,918 describes a raw batch for forming porous architectural structures using high water/cement ratios and water soluble foam stabilizers such as hydroxypropylmethyl cellulose, polyvinyl alcohol, or salts of poly(acrylic acid) or poly(methacrylic acid).

U.S. Pat. No. 4,473,406 describes unfoamed cementiferous compositions having improved flow characteristics by incorporation of copolymers of ethylenically-unsaturated carboxylic acids and hydroxy alkyl esters.

U.S. Pat. No. 4,792,360 describes unfoamed cement compositions comprising cement and polymers or copolymers of hydroxyalkyl (meth)acrylates.

U.S. Pat. No. 4,425,291 describes foamed alkali metal silicates using a surfactant and an aqueous natural latex dispersion for water-proofing.

U.S. Pat. No. 4,596,834 describes a foamed cementitious pipe insulation material using mineral acids as foam stabilizers.

British Patent No. 1,381,290 describes lightweight foamed magnesia cement modified with a polymer latex and using water-soluble silicone to stabilize the foam. Japanese Kokai No. 63-248,782 discloses lightweight aerated cement products using hydroxycarboxylic acid, polyhydric alcohol, polycarboxylic acid salt, lignin sulfonic acid salt/polyol, methyl cellulose and gelatin.

It is an object of the present invention to provide improvements over the techniques used in the prior art to give foamed hydraulic compositions which have improved foam stability, improved mechanical strength, improved water resistance and improved sound and thermal insulation.

SUMMARY OF THE INVENTION

A foamed hydraulic composition containing at least one hydraulic substance and from about 20 to about 130 parts by weight water and from about 0.01 to about 30 parts by weight of a copolymeric foam stabilizer, on the basis of 100 parts hydraulic substance, is provided.

The copolymeric foam stabilizers of this invention are copolymers formed from: a) about 0.1% to about 98% by weight of one or more non-ionic, ethylenically-unsaturated monomers; and b) from about 2% to about 40% by weight of one or more ethylenically-unsaturated ionic or ionizable monomers containing carboxylic acid. Preferably the copolymeric foam stabilizer contains greater than about 0.2 milliequivalents of carboxylic acid per solid gram of copolymeric foam stabilizer.

Preferably the copolymeric foam stabilizer also further contains hydroxy functionality.

The foamed composition can additionally contain from 0 to about 500 parts by weight of one or more of the following ingredients such as for example: foaming agents; polymeric binders; fillers; aggregates; fibers; pigments; thickeners; accelerators; retarders; and water reducers.

The foamed compositions of this invention are preferably prepared by mixing component one with component two, wherein a) component one is a foamed mixture which contains at least water and the copolymeric foam stabilizer, and b) component two contains at least water and one or more hydraulic substances.

The foamed compositions of this invention are useful as substrates in a variety of wall, floor and roof applications such as roof decks, lightweight shingles, tiles, slates, wall panels, exterior and interior flooring materials, roof panels, insulative composite boards, lightweight bricks, columns and insulative and flame-resistant coating materials, and in soil stabilization and other geotechnical uses.

DETAILED DESCRIPTION OF THE INVENTION

In accordance with the present invention, there are provided foamed hydraulic compositions containing at least one hydraulic substance and from about 20 to about 130 parts by weight water and from about 0.01 to about 30 parts by weight of a copolymeric foam stabilizer, on the basis of 100 parts hydraulic substance, wherein the copolymeric foam stabilizer is a copolymer formed from a) about 0.1% to about 98% by weight of one or more nonionic, ethylenically-unsaturated monomers and; b) from about 2% to about 40% by weight of one or more ionic or ionizable ethylenically-unsaturated monomers containing carboxylic acid.

These compositions are useful as substrates for floors, walls and roofs and have improved foam stability, improved mechanical strength, improved water resistance and improved sound and thermal insulative properties.

The foamed compositions of this invention are described herein based on the presence of 100 parts by weight of hydraulic substances contained in the compositions.

The term "hydraulic substance" as used herein means a substance which has the property of hardening through a hydration reaction when mixed with water. Some examples of suitable hydraulic substances for use in this invention include, portland cement, aluminum cement, jet cement, pozzolan cement, gypsum, plaster of paris, mixtures thereof, and the like. As used herein "gypsum" refers to calcium sulfate-containing materials having a variety of crystal forms or degrees of hydration from 0 to 2, such as for example, anhydrous calcium sulfate and calcium sulfate hemihydrate ($CaSO_4 \cdot H_2O$), and mixtures of such materials.

The weight fraction of water used in the foamed compositions of this invention is in the range consistent with that typically used in the construction industry. For hydraulic mixtures which do not contain fine sands or other water absorbing fillers, the amount of water used in the composition of the invention is in the range of from about 20 to about 100 parts. For mixtures containing fine sands (less than about 100 mesh) or other water absorbing fillers, the amount of water preferred for imparting the desired degree of workability to the hydraulic composition is usually higher, such as for example on the order of about 130 parts. Lower concentrations of water, such as for example in the range of from about 20 to about 70 parts is preferred in the compositions of this invention.

The compositions of this invention must contain from about 0.01 to about 30 parts by weight of a copolymeric foam stabilizer. The copolymeric foam stabilizer functions to stabilize the fine bubbles or cells introduced into these hydraulic compositions during preparations. The copolymeric foam stabilizers are polymers formed from one or more nonionic, ethylenically-unsaturated monomers, and from one or more ionic or ionizable ethylenically-unsaturated monomers, where at least one of the ionic or ionizable monomers contains carboxylic acid. The non-ionic monomers used in preparing the copolymer are used at concentrations in the range of from about 0.1% to 98% by weight of the copolymeric foam stabilizer. The concentration of the carboxylic acid monomer or monomers used in forming the copolymeric foam stabilizer range from about 2% to about 40% by weight of the copolymeric foam stabilizer. The remainder of said copolymeric foam stabilizer can include any ethylenically-unsaturated copolymerizable monomer.

The copolymeric foam stabilizer of the present invention can be water-soluble or water-insoluble. Preferably the copolymeric foam stabilizers are water-insoluble at room temperature.

The copolymeric foam stabilizers of this invention may be prepared by any well known polymerization technique, such as for example suspension, emulsion dispersion, or solution polymerization. Preferably, the copolymeric foam stabilizers are prepared by aqueous emulsion polymerization. Aqueous emulsion polymerization techniques suitable for use in the present invention are discussed in detail in D. C. Blackley, *Emulsion Polymerization* (Wiley, 1975).

The preparation of addition copolymers by emulsion polymerization is discussed in H. Warson, *The Applications of Synthetic Resin Emulsions* (Ernest Benn Ltd., 1972).

Conventional emulsion polymerization techniques may be used to prepare the copolymeric foam stabilizers employed in the compositions of this invention. The monomers may be emulsified with an anionic, cationic or nonionic dispersing agent or agents, at concentrations in the range of from about 0.5% to 10% on the weight of total monomers. A polymerization initiator of the free radical type, such as ammonium or potassium persulfate, may be used alone or in conjunction with an accelerator, such as potassium metabisulfite or sodium thiosulfate. The initiator and accelerator, commonly referred to as catalysts, may be used in conventional proportions, such as from 0.5 to 2% each based on the weight of monomers to be copolymerized. The polymerization temperature may be from room temperature to 90 degrees C. or more as is conventional.

Examples of emulsifiers which are suitable in the polymerization processes used in the present invention include alkaline metal and ammonium salts of alkyl, aryl, alkaryl, and aralkyl sulfonates, sulfates, and polyether sulfates; the corresponding phosphates and phosphonates; and ethoxylated fatty acids, esters, alcohols, amines, amides; and alkyphenols.

Chain transfer agents, including mercaptans, polymercaptans, and polyhalogen compounds, are often desirable in the polymerization mixture to control the copolymer molecular weight.

The copolymeric foam stabilizers of this invention can be of any molecular weight, but preferably have a weight average molecular weight (Mw) greater than about 1,000, more preferably greater than about 5,000, and most preferably greater than 20,000, as measured by aqueous gel permeation chromatography. The molecular weight was measured by hydrolyzing the polymer using KOH/ethanol and the molecular weight was then determined using aqueous gel permeation chromatography using poly(meth)acrylic acid polymers of known molecular weight as the standards.

The glass transition temperature of the copolymeric foam stabilizers is in the range of from about $-50°$ C. to about $100°$ C.

The copolymeric foam stabilizer can be a single stage copolymer or a multi-stage copolymer prepared by sequential emulsion polymerization techniques.

The non-ionic, ethylenically-unsaturated monomers useful in preparing the copolymeric foam stabilizers of this invention include a wide variety of non-ionic monomers having a vinylic group $>C=C<$. Examples of suitable non-ionic, ethylenically-unsaturated monomers include the hydroxy($C_2$-$C_4$)alkyl and ($C_1$-$C_{12}$)alkyl esters of acrylic acid, methacrylic acid, ethacrylic acid, and propacrylic acids; the ($C_1$-$C_{12}$)alkyl diesters of itaconic, citraconic, isocitraconic, fumaric, and maleic acids; styrene, and substituted styrenes such as for example vinyl toluene, divinylbenzene, dimethyl styrene, trimethyl styrene, ethyl styrene, methylethyl styrene, tert-butyl styrene, chloromethyl styrene, monochloro styrene, dichloro styrene, cyano styrene; vinyl acetate, vinyl propionate, vinyl butyrate, vinyl valerate, vinyl versatate, methyl vinyl ketone, ethyl vinyl ketone, acrylonitrile, methacrylonitrile, vinyl acrylate, butadiene, isoprene, chloroprene, and other alpha,beta-ethylenically-unsaturated monomers.

Preferred non-ionic, ethylenically-unsaturated monomers are hydroxy($C_2$-$C_4$)alkyl and ($C_1$-$C_8$)alkyl esters of acrylic, methacrylic, ethacrylic and propacrylic acids, styrene-type monomers and vinyl acetate-type monomers.

The most preferred non-ionic monomers are the hydroxy ($C_2$-$C_4$)alkyl and ($C_1$-$C_8$)alkyl esters of acrylic and methacrylic acids.

Preferably the copolymeric foam stabilizers contain hydroxy functionality. It is also preferred that the copolymeric foam stabilizers contain greater than about 0.1 milliequivalent of hydroxy functionality per solid gram of said copolymeric foam stabilizer. The milliequivalent of hydroxy functionality per solid gram of said copolymeric foam stabilizer is calculated by dividing the weight of the hydroxy-containing monomer used to make 1000 grams of polymer solid by the molecular weight of the hydroxy-containing monomer. Examples of suitable hydroxy-containing monomers useful in preparing the copolymeric foam stabilizer include hydroxy propyl methacrylate, hydroxy ethyl methacrylate, hydroxy butyl methacrylate, hydroxy propyl acrylate, hydroxy ethyl acrylate, hydroxy butyl acrylate and other hydroxy($C_1$-$C_{12}$)alkyl acrylates and methacrylates. The carboxylic acid-containing monomers useful in preparing the copolymer foam stabilizer are alpha,-beta-monoethylenically-unsaturated acids, dicarboxylic acids, and partial esters of dicarboxylic acids. Some examples of suitable carboxylic acid-containing monomers include acrylic acid, methacrylic acid, itaconic acid, maleic acid, acryloxypropionic acid, fumaric acid, aconitic acid, crotonic acid, citraconic acid, methyl acid itaconate, butyl acdi itaconate, ethyl acid fumarate, butyl acid fumarate, acid maleate, and the like.

Preferably the carboxylic acid-containing monomers are selected from acrylic acid, methacrylic acid, acryloxypropionic acid and itaconic acid.

Preferably the copolymeric foam stabilizers contain greater than about 0.2 milliequivalents of carboxylic acid per solid gram of said copolymeric foam stabilizer; more preferably about 0.3 to about 5.0 milliequivalents; and most preferably about 0.7 to about 5.0 milliequivalents of carboxylic acid per solid gram of copolymeric foam stabilizer. The milliequivalents of carboxylic acid per solid gram of copolymer is calculated in the same manner as described above with regard to the hydroxy-containing monomers.

When the hydraulic substance to which the copolymeric foam stabilizer is to be added is predominantly (greater than about 70 percent by weight) gypsum, it is necessary to partially or completely neutralize the ionic or ionizable functional groups in the copolymer. This neutralization step is accomplished simply by the addition of a base such as for example a dilute aqueous solution of sodium hydroxide.

The foamed compositions of this invention can additionally contain from 0 to about 500 parts by weight of one or more of the following conventional ingredients: foaming agents, polymeric binders, fillers, aggregates, fibers, pigments, thickeners, accelerators, retarders and water reducers.

The term "foaming agent" as used herein means a substance that can introduce fine gas bubbles into the compositions of this invention. Typical foaming agents are anionic, nonionic or cationic surfactants and hydrolyzed proteins. The foaming agent can also be of the reactive type such as aluminum powder which generates hydrogen bubbles when mixed with wet cement. The foaming agent is preferably used at a level of 0 to about 10 parts by weight based on 100 parts by weight of hydraulic substance.

Polymer binders are the film-forming polymers typically used to modify cement and gypsum. These binders generally are high molecular weight, low glass transition (Tg), low acid containing polymers such as, for example, acrylic copolymers, styrene/butadiene copolymers, vinylidene chloride polymers, vinyl chloride/vinylidene chloride copolymers, vinyl acetate polymers, vinyl versatate polymers and the like. Suitable polymer cement binders for use in this invention are also described in U.S. Pat. No. 4,113,913 which is herein incorporated by reference.

Suitable fillers for this invention include substances such as sand, clay, fly ash, shale and the like. Suitable aggregates include substances like gravel, crushed rocks and the like. The fillers and aggregates can make up from 0 to about 400 parts by weight of the compositions of this invention based on 100 parts by weight of hydraulic substances.

The foamed compositions of this invention can also optionally contain plastic or metallic scrims and fibers, such as, for example, glass fibers, ceramic fibers, glass-/ceramic fibers, metallic wires, mineral fibers, and natural and synthetic fibers such as cotton, wool, nylon, rayon, polyesters and the like.

The foamed compositions of this invention can optionally contain pigments such as titanium dioxide, carbon black, iron oxide and the like.

Suitable accelerators include, for example, $CaCl_2$, $Na_2CO_3$, $NaOH$, $CaO$, $Ca(OH)_2$, calcium formate and the like.

Suitable retarders include, for example, sodium citrate, sodium phosphate and the like.

The foamed compositions of the present invention can optionally contain from 0 to about 5 parts by weight of water reducers based on 100 parts by weight of hydraulic substances. As used herein, the term "water reducer" means a substance which is generally used in cement, concrete and gypsum to improve the flow properties so that the compositions can be pumped or effectively poured. The water reducers, also commonly referred to as superplasticizers, can be used to make hydraulic compositions with a reduced water content which still retain adequate flow properties. Examples of suitable water reducers for use in this invention include, for example, lignosulfonates, sodium naphthalene sulfonate formaldehyde condensates and the like.

In the practice of the process of the present invention it is preferable to utilize a water reducer. We have found that it is more preferred to utilize a water reducer in Component 2 (the hydraulic mix, as defined hereinafter).

The foamed compositions of this invention can be prepared by any of the known methods for making foamed hydraulic compositions, such as, for example, aeration by mechanical mixing, heat expansion of Freon TM, aeration by compressed gases and hydrogen generation through the reaction of aluminum powder with sodium hydroxide. Typically, the foamed compositions of this invention are prepared by the thorough mixing of a prefoam component (hereinafter referred to as Component 1) with a hydraulic slurry component (hereinafter referred to as Component 2). The prefoam component typically contains at least a foamed mixture of water and the copolymeric foam stabilizer of this invention. The prefoam component preferably contains one or more foaming agents as described earlier. The hydraulic slurry component typically contains at least water, a water reducer (preferably at a concentration of from about 0.1 part to about 5 parts on 100 parts hydraulic composition) and one or more hydraulic substances as described above.

The hydraulic slurry component may also contain the copolymeric foam stabilizer, however, this is not preferred to its use in Component 1. The foamed compositions can also be prepared by chemically or mechanically foaming a mixture containing a prefoam component with a hydraulic slurry.

The foamed compositions of this invention are useful in making lightweight substances for a variety of applications. Conventional concrete usually weighs between about 120 to about 150 pounds per cubic feet (about 2 to about 2.4 grams per cubic centimeter (g/cc), whereas the improved lightweight hydraulic compositions of this invention are useful for making substrates having a density of from about 5 to about 100 pounds per cubic feet (0.08 to 1.6 g/cc). The low density foamed substrates of this invention, such as for example those having densities in the range of from about 5 to about 20 lbs./ft$^3$ (0.08 to 0.3 g/cc), are useful as non-load-bearing insulative materials, such as for example as wall insulation between structural boards. The foamed substrates of the invention having medium densities, such as for example in the range of from about 20 to 50 lbs./ft$^3$ (0.3 to 0.8 g/cc), are useful as roof decks, shingles, coatings, and panels and boards for light load-bearing applications. The high density (such as those having densities in the range of from about 40 to about 100 lbs./ft$^3$ (0.65 to 1.6 g/cc) foamed substrates of the invention are useful as shingles, panels, tiles, subfloors, and boards for load bearing applications. All of the above lightweight foamed articles may be combined with scrims, incorporated or impregnated with fibers, or coated with thin non-foamed materials, to further improve their flexural or impact strengths for specific applications such as for example for use as shingles or boards.

The foamed compositions are useful in various pre-cast and cast-in-place applications. The pre-cast boards, panels, shingles, tiles and other architectural structures can be formed by pouring the foamed compositions into a form or mold and allowing the foamed composition to set. The foamed compositions can also be made into composite laminates with other plastic or inorganic structural members. The cast-in-place architectural structures can be formed by spraying, pumping or pouring the foamed composition onto a variety of horizontal or vertical surfaces and allowing the foamed composition to cure.

The foamed compositions of this invention possess significantly improved foam stability over conventional foamed materials prepared with conventional foaming agents, such as surfactants, and are resistant to foam collapse. The foamed compositions also provide substrates with improved physical properties such as water resistance, improved hardness, improved mechanical strength, improved thermal insulation and flame resistance.

The lightweight low density foamed compositions of this invention may be used as landfill cover or for other soil stabilization applications, such as for example exterior basement waterproofing applications, where a water resistant material with some degree of strength is required.

The following examples are presented to demonstrate this invention. The examples are intended in an illustrative sense only and are not intended, nor should they be construed as limiting the scope of the present invention, as other compositions within the scope of the invention and applications therefor should be apparent to those of ordinary skill in the art from these examples. All parts and percentages used in the examples are on a weight basis unless otherwise indicated.

The following abbreviations are used in the examples
AA = acrylic acid
APS = ammonium persulfate
BA = butyl acrylate
HEA = hydroxyethyl acrylate
HEMA = hydroxyethyl methacrylate
HPMA = hydroxypropyl methacrylate
MAA = methacrylic acid
MMA = methyl methacrylate
n-BuSH = n-butanethiol
n-DDM = dodecyl mercaptan
SLS = sodium lauryl sulfate
SSF = sodium sulfoxylate formaldehyde
SVS = sodium vinyl sulfonate
t-BHP = t-butyl hydroperoxide
VA = vinyl acetate

EXAMPLE 1

Preparation of Copolymeric Foam Stabilizer

Utilizing conventional emulsion polymerization techniques, a latex polymer having the following composition 48.7 MMA/45.3 BA/6 MAA was prepared via a thermal gradual addition process at 80° C. To a 5-liter, 4-neck flask equipped with a condenser, thermometer, stirrer, and inlets for monomer emulsion and catalyst co-feeds, was charged with 1360.8 grams of deionized water and 36.28 grams of surfactant Aerosol A103 (American Cyanamid Chemical Products Division) a disodium ethoxylated nonylphenol half ester of sulfosuccinic acid.

A pre-mixed monomer emulsion was prepared as described below.

| Quantity | Material |
| --- | --- |
| 573.3 g. | Deionized Water |
| 89.2 g. | Aerosol A 103 |
| 819.2 g. | BA |
| 880.7 g. | MMA |
| 108.5 g. | MAA |

After pre-heating the vessel to 85° C., 8.9 grams of APS in 35.3 grams of deionized water was added. The monomer emulsion given above and a APS co-feed (2.2 grams APS in 168 grams deionized water) were added over 3 hours at 80° C. After a 30 minute hold period, the reaction temperature was lowered to 60° C. The reaction was chased with using 3 conventional chasers described below. A 15 minute hold period was used between each chase.

| | Chaser 1 |
| --- | --- |
| 10.6 g. | 0.15% Iron (II) Sulfate 7H$_2$O |
| 0.85 g. | t-BHP in 4.3 grams deionized water |
| 0.43 g. | SSF in 26.4 grams deionized water |
| | Chaser 2 and 3 |
| 1.7 g. | t-BHP in 8.9 grams deionized water |

-continued

The final properties of the latex polymer are as follows:

pH = 3.5
Particle size = 88 nanometers
Solids = 47.8%
Viscosity (#2/60 rpm) = 400 centipose

EXAMPLES 2-38

Following the procedure of Example I, various copolymeric foam stabilizers within the scope of this invention were prepared having the compositions as shown in Table I below.

85.65 VA/17.71 BA/8.64 AA (1.06 n-BuSH) was prepared via a thermal gradual addition process at 80° C. To a 5-liter, 4-neck flask equipped with a condenser, thermometer, stirrer, and inlets for monomer emulsion, chain transfer agent and catalyst co-feeds, was charged with 2352.9 grams of deionized water and 30.5 grams of Alipal CO-436 (GAF Corporation, Chemical Products Division). A pre-mixed monomer emulsion was prepared as described below.

| Quantity | Material |
|---|---|
| 284.7 g. | Deionized Water |
| 89.2 g. | Alipal CO-436 |
| 870.0 g. | VA |

TABLE 1

| pH | Composition Visc PS | Surfactant[1,2] | | Solids | |
|---|---|---|---|---|---|
| Ex. 2 | 44.86 BA/35.04 MMA/10.6 MAA/9.5 HEMA | Wayfos solution | 52.0 | | 156 | |
| Ex. 3 | 44.86 BA/35.02 MMA/10.06 MAA/9.5 HEMA | Wayfos solution | 52.5 | | 227 | 151 |
| Ex. 4 | 44.86 BA/39.64 MMA/9.5 HEMA/6.00 MAA | Aerosol A103 | 51.0/48.2 | 3.83/7.04 | | 121 |
| Ex. 5 | 43.52 BA/30.88 MMA/15.0 HEM/10.6 MAA (1.91 n-DDM/0.25 3-MPA) | Wayfos solution | 45.2/41.7 | 3.05/7.03 | 29.5/56.0 | |
| Ex. 6 | 41.95 BA/37.05 MMA/15.0 HEMA/6.0 MAA (1.91 n-DDM/0.25 3-MPA) | Wayfos solution | 45.7/43.7 | 2.95/6.96 | 36.5/35 | |
| Ex. 7 | 43.52 BA/30.88 MMA/15.0 HEMA/10.5 MAA (1.91 n-DDM/0.25 3-MPA) | Aerosol A103 | 45.4/42.0 | 2.46/6.85 | 36.0/60.0 | |
| Ex. 8 | 41.95 BA/37.05 MMA/15.0 HEMA/6.0 MAA (1.91 n-DDM/0.25 3-MPA) | Aerosol A103 | 45.5/42.9 | 2.60/7.06 | 29.5/33.8 | |
| Ex. 9 | 44.68 BA/35.22 MMA/9.5 HEMA/10.6 MAA (1.91 n-DDM/0.25 3-MPA) | Aerosol A103 | *****/41.6 | 2.39/6.82 | | |
| Ex. 10 | 43.10 BA/41.40 MMA/9.5 HEMA/6.0 MAA (1.91 n-DDM/0.25 3-MPA) | Aerosol A103 | 44.6/42.5 | 2.33/6.94 | | |
| Ex. 11 | 48.45 BA/30.55 MMA/15.0 HEMA/6.0 MAA (1.91 n-DDM/0.25 3-MPA) | Aerosol A103 | 45.3/43.0 | 2.50/6.94 | | |
| Ex. 12 | 50.02 BA/24.38 MMA/15.0 HEMA/10.6 MAA (1.91 n-DDM/0.25 3-MPA) | Aerosol A103 | 44.5/41.6 | 2.56/6.66 | | |
| Ex. 13 | 49.60 BA/34.90 MMA/9.5 HEMA/6.0 MAA (1.91 n-DDM/0.25 3-MPA) | Aerosol A103 | 45.0/42.5 | 2.23/7.14 | | ****/120 |
| Ex. 14 | 51.18 BA/28.72 MMA/9.5 HEMA/10.6 MAA (1.91 n-DDM/0.25 3-MPA) | Aerosol A103 | 45.9/42.6 | 2.39/6.60 | | ****/117 |
| Ex. 15 | 41.02 BA/34.03 MMA/15.0 MAA/9.5 HEMA | Aerosol A103 | 45.4 | 3.62 | | 107 |
| Ex. 16 | 44.86 BA/35.02 MMA/10.06 MAA/9.5 HEMA | Aerosol A103 | 45.6 | | | 93 |
| Ex. 17 | 46.86 BA/42.54 MMA/10.6 MAA | Aerosol A103 | 46.9 | 3.86 | 375 | 82 |
| Ex. 18 | 44.86 BA/35.04 MMA/10.6 MAA/9.5 HEMA (1.0 n-DDM/0.15 3-MPA) | Aerosol A103 | 43.9 | | | 109 |
| Ex. 19 | 44.86 BA/35.04 MMA/10.6 MAA/9.5 HEMA (2.0 n-DDM/0.25 3-MPA) | Aerosol A103 | 43.7 | | | 158 |
| Ex. 20 | 41.95 BA/37.05 MMA/15.0 HEMA/6.0 MAA (1.0 n-DDM/0.15 3-MPA) | Wayfos solution | 43.1 | 6.94 | | |
| Ex. 21 | 41.95 BA/37.05 MMA/15.0 HEMA/6.0 MAA | Wayfos solution | 43.8 | 6.59 | | |
| Ex. 22 | 44.86 BA/35.04 MMA/10.6 MAA/9.5 HEMA | Aerosol A103 | 45.6 | | | 107 |
| Ex. 23 | 44.86 BA/35.04 MMA/10.6 MAA/9.5 HEMA | Aerosol A103 | 44.9 | 4.16 | 20.5 | 97 |
| Ex. 24 | 48.70 MMA/45.3 BA/6.0 MAA | Aerosol A103 | 47.8 | 3.48 | 400 | 88 |
| Ex. 25 | 52.70 MMA/44.3 BA/3.0 MAA | Aerosol A103 | 48.0 | 3.14 | 241 | 81 |
| Ex. 26 | 56.10 MMA/43.4 BA/0.5 MAA | Aerosol A103 | 45.6 | 3.38 | 74.5 | 90 |
| Ex. 27 | 47.9 MMA/43.2 BA/8.9 AA | Aerosol A103 | 45.8 | 2.98 | 124 | 92 |
| Ex. 28 | 51.8 MMA/43.2 BA/5.0 AA | Aerosol A103 | 45.7 | 3.02 | 70 | 93 |
| Ex. 29 | 54.3 MMA/43.2 BA/2.5 AA | Aerosol A103 | 45.9 | 3.15 | 69.5 | 93 |
| Ex. 30 | 53.7 MMA/44.0 BA/2.3 IA | Aerosol A103 | 35.6 | 2.77 | 11 | 87 |
| Ex. 31 | 50.6 MMA/44.8 BA/4.6 IA | Aerosol A103 | 35.9 | 2.72 | 11 | 91 |
| Ex. 32 | 46 MMA/46 BA/8 IA | Aerosol A103 | 33.6 | 2.57 | 10.5 | 109 |
| Ex. 33 | 58.17 BA/21.73 MMA/10.6 MAA/9.5 HEMA | Aerosol A103 | 47.4 | 3.70 | 121 | 109 |
| Ex. 34 | 51.18 BA/28.72 MMA/10.6 MAA/9.5 HEMA | Aerosol A103 | 48.6 | 3.56 | 224 | 108 |
| Ex. 35 | 43.2 BA/37.7 MMA/10.6 MAA/8.5 HEA | Aerosol A103 | 45.1 | 3.43 | 82.5 | 95 |
| Ex. 36 | 43.9 MMA/41.6 BA/8.5 HEA/6 MAA | Aerosol A103 | 45.7 | 3.35 | 95.5 | 90 |
| Ex. 37 | 45.5 BA/33.4 MMA/10.6 MAA/10.5 HPMA | Aerosol A103 | 45.3 | 3.59 | 62.5 | 101 |
| Ex. 38 | 43.9 BA/39.6 MMA/10.5 HPMA/6.0 MAA | Aerosol A103 | 45.2 | 3.49 | 60 | 96 |

1) A solution of 36.2 grams of Wayfos M60 (Philip Hunt Chem. Corp.), 7.7 grams of ammonium hydroxide (28%) and 197.2 grams of deionized water was used in place of Aerosol A103. 75.7 grams of Wayfos solution was used in the kettle and 165.4 grams was used in the monomer emulsion.
2) Wayfos is an aromatic phosphate ester in free acid form.

EXAMPLE 39

Preparation of Copolymeric Foam Stabilizer Containing Vinyl Acetate

Following conventional emulsion polymerization techniques a latex polymer having the composition

| 209.2 g. | BA |
| 102.1 g. | AA |

After pre-heating the vessel to 80° C., 4.7 grams of APS in 42 grams of deionized water was added. The monomer emulsion given above, 12.5 grams of n-BuSH and a APS co-feed (1.2 grams APS in 84 grams deionized water) were added over 3 hours at 80° C. After a 90 minute hold period, the reaction temperature was cooled to room temperature. A solution of 10% sodium carbonate in water was add to adjust the pH above 6.4. The final properties of the latex polymer are as follows:
pH=6.6
Particle size=87 nanometers
Solids=26.5%
Viscosity (#2/60 rpm)=21.5% centipoise

EXAMPLES 40-41

Following the procedures of Example 39 above, copolymeric foam stabilizers within the scope of this invention were prepared as shown in Table II below.

TABLE II

| | Composition | Solids | pH | Visc. | Particle size(ps) |
|---|---|---|---|---|---|
| Ex. 40 | 85.65 VAC/13.35 BA/ 1.0 AA (1.06 n-BuSH) | 27.2 | 7.06 | 6.5 | 74 |
| Ex. 41 | 66.43 VAC/16.64 BA/ 8.64 AA/8.33 HEA (1.06 n-BuSH) | 26.6 | 6.41 | 5.5 | 414 |

EXAMPLE 42 (COMPARATIVE)

Following the procedures of Example 39 above, a polymeric foam stabilizer falling outside the scope of this invention was prepared having a composition of 86.8% vinyl acetate and 13.2% butyl acrylate. The polymeric emulsion prepared hereby had a total solids of 27.8%, pH of 7.4, viscosity of 6.5 centipoise and avg. particle size of 94 nanometers.

EXAMPLE 43

Preparation of Multi-stage Copolymeric Foam Stabilizer

Following conventional emulsion polymerization techniques a latex polymer having a core of the composition 39.9 BA/29.1 MMA/1.0 MAA and a shell of the composition 18 MMA/7.5 MAA/4.5 HEMA was prepared via a thermal gradual addition process at 80° C. To a 5-liter, 4-neck flask equipped with a condenser, thermometer, stirrer, and linnets for monomer emulsion and catalyst co-feeds, was charged with 1049 grams of deionized water and 3.96 grams of SLS (28%). A premixed monomer emulsion was prepared as described below.

| Quantity | Material |
|---|---|
| 394.0 g. | Deionized Water |
| 42.2 g. | SLS (28%) |
| 673.8 g. | BA |
| 491.7 g. | MMA |
| 16.5 g. | MAA |

After pre-heating the vessel to 82° C., 3.0 grams of APS in 19.1 grams of deionized water was added, followed by 40 grams of monomer emulsion given above. After 15 minutes the remaining monomer emulsion and an APS co-feed (1.8 grams APS in 130 grams deionized water) were added over 2 hours at 80°-82° C. A second pre-mixed monomer emulsion was prepared as described below.

| Quantity | Material |
|---|---|
| 100. g. | Deionized water |
| 5.1 g. | Alipal CO-436 (58%) (GAF Corp., Chem. Prod.) |
| 177.3 g. | MMA |
| 73.9 g. | MAA |
| 44.3 g. | HEMA |
| 5.9 g. | n-DDM |
| 3.0 g. | 3-MPA |

After the first stage feeds are completed the second monomer emulsion and an APS co-feed (0.6 grams of APS in 44.3 grams of deionized water) was added over 45 minutes. After a 30 minute hold period, the reaction temperature was lowered to 60° C.
The reaction was chased with using a conventional chaser described below.
4.6 g. 0.15% Iron (II) Sulfate.7H$_2$O
0.89 g. t-BHP in 8.9 grams deionized water
0.44 g. SSF in 13.8 grams deionized water
The final properties of the latex polymer are as follows:
Particle size=230 nanometers
Solids=45.1%

EXAMPLES 44-49

Following the procedures of Example 43, various multi-stage,c opolymeric foam stabilizers (solids and Particle size(PS)) within the scope of this invention were prepared as shown in Table III below.

TABLE III

| | Composition Core//Shell | Solids | PS |
|---|---|---|---|
| Ex. 44 | 22.8 BA/16.6 MMA/0.6 MAA//36 MMA/15 MAA/9 HEMA (1.2 n-DDM/0.6 3-MPA) | 47 | 212 |
| Ex. 45 | 28 BA/20.75 MMA/0.75 MAA//30 MMA/12.5 MAA/7.5 HEMA (1.0 n-DDM/0.5 3-MPA) | 46.2 | 169 |
| Ex. 46 | 34.2 BA/24.9 MMA/0.9 MAA//24 MMA/10 MAA/6 HEMA (0.8 n-DDM/0.4 3-MPA) | 45.9 | 173 |
| Ex. 47 | 39.9 BA/29.1 MMA/1.0 MAA//18 MMA/7.5 MAA/4.5 HEMA (0.6 n-DDM/0.3 3-MPA) | 45.1 | 230 |
| Ex. 48 | 39.9 BA/29.12 MMA/0.98 MAA//18 MMA/7.5 MAA/4.5 HEMA (0.6 n-DDM/0.3 3-MPA) | 46.0 | 149 |
| Ex. 49 | 39.9 BA/38.7 MMA/1.2 MAA//12.1 MMA/5.0 HEMA/3.1 MAA | 37.8 | 180 |

EXAMPLE 50

Foamed Cement Containing Copolymeric Foam Stabilizer

A low molecular weight ($M_w$ less than about 100,000) copolymeric foam stabilizer prepared by aqueous emulsion polymerization as described above in examples 5-14 was evaluated in a foamed hydraulic composition. The copolymeric foam stabilizer had a composition of 35.5% butyl acrylate, 25.3% methyl methacrylate, 10.1% styrene, 13.8% hydroxyethyl methacrylate and 15.2% methacrylic acid. The foamed compositions were prepared by mixing a component one prefoam and a component two cement slurry. The copolymeric foam stabilizer was added only in the prefoam (Sample A), only in the cement slurry (Sample B), or in both the prefoam and cement slurry (Sample C).
A comparative foamed cementitious composition was prepared using no foam stabilizer (Sample D).

The foamed cementitious compositions were evaluated for foam stability expressed as % foam collapse and for relative hardness after 1-day room temperature cure.

The foamed cementitious compositions described herein were made by mixing a preformed foam from Component one with a cement slurry from Component two. In making the preformed foam at least 100 grams of Component one was first added into a five quart Stainless steel bowl. The content was whipped on a 10 speed Hobart TM blender (Kitchen Aid brand) until a low density foam having a density of 0.03-0.06 g./cc. was reached. This usually took 1-2 minutes. During this time a cement slurry (containing Component two) was prepared in a separate blender. The hydraulic material, such as for example Portland cement, was mixed with the liquid additive using a mixer blade. A fixed amount of prefoam from Component one was added into the cement slurry from Component two and the density of the final foam (cementitious) was measured.

To measure the relative hardness the foamed cement was cast in 4 ounce paper cups. After the samples were cured at room temperature for one day, the relative hardness was measured by the amount of depression caused by a tongue depressor. During the depression test the tongue depressor was held only by thumb and index finger and a relative hardness rating of 1 (softest) to 10 (hardest) was recorded.

Foam collapse was calculated from the difference between the predicted density ($D_0$) (assuming 0% collapse) and the wet density actually measured (D). The predicted density $D_0$ was calculated from the density of prefoam $D_1$, the density of cement slurry $D_2$, the weight of prefoam $W_1$ and the weight of cement slurry $W_2$ as shown below:

$$D_o = (W_1 + W_2)/((W_1/D_1) + (W_2/D_2))$$

$$\text{Foam Collapse} = \frac{D - D_o}{D_o}$$

$W_1$: weight of the prefoam
$W_2$: weight of the cement slurry
$D_0$: predicted density
D: wet density actually measured
$D_1$: density of the prefoam
$D_2$: density of the cement slurry The results are presented in Table IV below.

TABLE IV

| | Sample: | | | |
|---|---|---|---|---|
| | A | B | C (comparative) | D (comparative) |
| | composition (parts by weight) | | | |
| Component One | | | | |
| Copolymeric foam stabilizer | 2 | 0 | 2 | 0 |
| siponate DS-4 | 0.2 | 0.2 | 0.2 | 0.2 |
| water | 20 | 20 | 20 | 20 |
| Component Two | | | | |
| Copolymer foam stabilizer | 0 | 16 | 16 | 0 |
| water | 172 | 152 | 152 | 172 |
| Portland Cement type I | 400 | 400 | 400 | 400 |
| Performance | | | | |
| Foam collapse in 24 hours (%) | 30 | 80 | 20 | total collapse |
| relative hardness after 1 day at room temperature (1 = soft, 10 = hard) | 9 | 3-4 | 2 | — |

Siponate DS-4 is sodium dodecyl benzene sulfonate

EXAMPLE 51

Copolymeric Foam Stabilizers with Varying Acid Levels

Copolymeric foam stabilizers within the scope of this invention were evaluated in foamed hydraulic compositions as described in Example 50.

The copolymeric foam stabilizer of Example 21 (sample E) had the composition 42% butyl acrylate, 37% methylmethacrylate, 15% hydroxy ethyl methacrylate and 6% methacrylic acid, and had 0.7 milliequivalent of acid per solid gram of polymer.

The copolymeric foam stabilizer of Example 22 (sample F) had the composition 44.9% butyl acrylate, 35% methyl methacrylate, 9.5% hydroxy ethyl methacrylate and 10.6% methacrylic acid, and had 1.2 milliequivalents of acid per gram. The comparative sample G had the composition: 50% butyl acrylate, 48.5% methyl methacrylate and 1.5% methacrylic acid (0.17 milliequivalent of acid per gram of polymer solids).

The foamed compositions were evaluated for crack formation and water resistance as measured by differential weights before and after the sample was water soaked (immersion in water for 24 hours) divided by initial weight before immersion. The results are presented in Table V and show that the low acid containing comparative sample G had crack formation and poor water resistance.

TABLE V

| | Sample: | | |
|---|---|---|---|
| | E | F | G (comparative) |
| | (parts by weight) | | |
| Component One | | | |
| Copolymeric foam stabilizer E | 3.5 | 0 | 0 |
| Copolymeric foam stabilizer F | 0 | 3.5 | 0 |
| Copolymeric foam stabilizer G | 0 | 0 | 3.5 |
| siponate DS-4 | 0.07 | 0.07 | 0.07 |
| water | 3.5 | 3.5 | 3.5 |
| Component Two | | | |
| water | 41 | 41 | 41 |
| Portland Cement Type I | 100 | 100 | 100 |
| Performance | | | |
| Deep crack/crevice formation | non-visible | non-visible | significant |
| performance in water soak | stayed afloat for >24 hours | stayed afloat for >24 hours | sank in one minute |

EXAMPLES 52-56

Foamed Cementitious Compositions Containing Copolymeric Foam Stabilizer and Water Reducer Foamed cementitious compositions within the scope of this invention (Ex. 52-55) were prepared following the procedures of Ex. 50, except that one or more water reducers were added to compositions (Ex. 52-54). Comparative Example 56 was a foamed cementitious composition containing the water reducer, but wherein the copolymeric foam stabilizer of this invention had been omitted. The foamed compositions were evaluated for foam stability and water resistance. The results are presented in Table VI below.

In the water uptake measurements foamed cement blocks cast in 4 ounce cups and cured at room temperature for more than 3 days were demolded and weighed. The foamed blocks were then put into a deep plastic tray. Weights and scrim were used to keep the foamed blocks submerged when the tray was filled with water. After 24 hours immersion the foamed blocks were taken out of the tray and their surface water was wiped off with a piece of cheese cloth before weighing. From the original dry weight and the weight after 24 hours immersion, the percent water uptake was calculated.

TABLE VI

| | Composition (parts by weight) Ex.: | | | | |
|---|---|---|---|---|---|
| | 52 | 53 | 54 | 55 | 56* |
| Component One | | | | | |
| Copolymeric foam stabilizer** | 4.3 | 3.8 | 3.8 | 3.8 | 0 |
| Naphthalene sulfonate Polymer (43%) | 0.6 | 0 | 0 | 0 | 0 |
| Sodium dodecyl benzene sulfonate | 0.06 | 0.06 | 0.06 | 0.06 | 0.06 |
| Water | 3.7 | 3.2 | 3.2 | 3.2 | 7 |
| Component Two | | | | | |
| Naphthalene sulfonate Polymer (43%) | 0 | 2.0 | 0 | 0 | 2.0 |
| Daxad 19 water reducer*** | 0 | 0 | 0.9 | 0 | 0 |
| Water | 43 | 41 | 42 | 45 | 41 |
| Portland cement | 100 | 100 | 100 | 100 | 100 |
| Performance | | | | | |
| Foam stability | Good | Good | Good | Poor | Total Collapse |
| Water uptake | <30% | <30% | <30% | >50% | — |

*comparative
**copolymeric foam stabilizer Example 22
***Daxad 19 is a water reducer in powder form manufactured by W. R. Grace & Company.

EXAMPLES 57–60

Foamed cementitious compositions within the scope of this invention were prepared following the procedures of Ex. 50. Examples 57–59 used copolymeric foam stabilizers with various levels of hydroxy functionality. Ex. 60 used copolymeric foam stabilizers containing no hydroxy functionality. The compositions of examples 57–59 had less than 15% of the pores or cells at a diameter of 3/64 inch or greater, while the composition of Ex. 60 had more than 50% of the pores or cells at a diameter of 3/64 inch or greater. Larger pore size correlates to poorer insulative value, lower strength and higher water uptake.

The compositions are presented in Table VII.

TABLE VII

| | | Composition (parts by weight) Example: | | | |
|---|---|---|---|---|---|
| | | 57 | 58 | 59 | 60 |
| Component One | | | | | |
| | Acid (meq./g. solid) | | | | |
| copolymeric foam stabilizer^a (44.9 BA/ /35 MMA/9.5 HEMA/10.6 MAA) (Ex 22) | 1.2 | 2 | 0 | 0 | 0 |
| copolymeric foam stabilizer^a (43.2 BA/ 37.7 MMA/ 8.5 HEA/10.6 MAA)(Ex 35) | 1.2 | 0 | 2 | 0 | 0 |
| copolymeric foam stabilizer^a (45.5 BA/ 33.4 MMA/10.5 HPMA/10.6 MAA) (EX 37) | 1.2 | 0 | 0 | 2 | 0 |
| copolymeric foam stabilizer^a (46.9 A/ 42.5 MMA/10.6 MAA) (Ex 17) | 1.2 | 0 | 0 | 0 | 2 |
| Sodium dodecyl benzene sulfonate | | 0.06 | 0.06 | 0.06 | 0.06 |
| water | | 6 | 6 | 6 | 6 |
| Component Two | | | | | |
| Naphthalene Sulfonate Polymer (43%) | | 1.9 | 1.9 | 1.9 | 1.9 |
| Water | | 40 | 40 | 40 | 40 |
| Portland Cement Type 1 | | 100 | 100 | 100 | 100 |

^a All the polymers have 46% total solids.

EXAMPLES 61–62

A foamed hydraulic composition within the scope of this invention (Example 61) was prepared following the procedures of Ex. 50 and containing a copolymeric foam stabilizer A having the composition 44.9% butyl acrylate, 35% methyl methacrylate, 9.5% hydroxy ethyl methacrylate and 10.6% methacrylic acid (Example 22) having 1.2 milliequivalents of acid.

A comparative foamed hydraulic composition (Example 62) was prepared using a low acid containing control polymer B comprising 50% BA; 48.5% MMA; and 1.5% MAA and having 0.17 milliequivalents of acid per solid gram. The compositions were evaluated for foam collapse, compressive strength, tensile strength and pore sizes. The results are presented in Table VIII.

TABLE VIII

| | Composition (parts by weight) Example: | |
|---|---|---|
| | 61 | 62 comparative |
| foam stabilizer A (44.9 BA/35 MMA/9.5 HEMA/10.6 MAA) acid = 1.2 meq./g. solid | 2 | 0 |
| foam stabilizer B (acid = 0.17 meq./g. solid) | 0 | 2 |
| sodium dodecyl/benzene sulfonate | 0.06 | 0.06 |
| water | 6 | 6 |
| Component Two | | |
| naphthalene sulfonate Polymer (43%) | 2 | 2 |
| water | 38 | 38 |
| Portland Cement Type 1 | 100 | 100 |
| Performance | | |
| Foam collapse (after 24 hours) | <10% | >50% |
| Compressive strength (psi) | 180–220 | <150 |
| Tensile strength (psi) | 30–35 | <20 |
| Pore size (% > 2/64 inch) | <20% | >50% |

EXAMPLES 63-65

Foamed cementitious compositions (Examples 63-65) within the scope of this invention were prepared following the procedures of Ex. 50, and containing different grades of sand. All the compositions had less than 10% foam collapse at a density of 0.7-0.8 g/cm³. The specific compositions are presented in Table IX below.

TABLE IX

| | Composition (parts by weight) Example: | | |
|---|---|---|---|
| | 63 | 64 | 65 |
| Component One | | | |
| copolymeric foam stabilizer (Ex. 22) | 3.2 | 3.2 | 3.2 |
| sodium dodecyl/benzene sulfonate | 0.06 | 0.06 | 0.06 |
| water | 3.2 | 3.2 | 3.2 |
| Component Two | | | |
| naphthalene sulfonate Polymer (43%) | 4.2 | 2.7 | 2.2 |
| water | 92 | 60 | 48 |
| Portland Cement Type 1 | 100 | 100 | 100 |
| Sand | 200 | 200 | 200 |
| (size in mesh) | (325) | (140) | (60) |

EXAMPLES 66 AND 67

Foamed cementitious compositions within the scope of this invention (Examples 66 and 67) were prepared following the procedures of Ex. 50 containing copolymer foam stabilizers with varying glass transition temperature. The compositions are given in Table X below. Ex. 66 and Ex. 67 showed less than 10% foam collapse.

TABLE X

| | Composition (parts by weight) Example: | |
|---|---|---|
| | 66 | 67 |
| Component One | | |
| | Tg (°C.) | | |
| copolymeric foam stabilizer (51.6 BA/42.4 MMA/6 MAA) | +5 | 3.5 | 0 |
| copolymeric foam stabilizer (58.6 BA/35.4 MMA/6 MAA) | -5 | 0 | 3.5 |
| sodium dodecyl benzene sulfonate | | 0.05 | 0.05 |
| water | | 3.5 | 3.5 |
| Component Two | | | |
| naphthalene sulfonate (43%) | | 2 | 2 |
| water | | 38 | 38 |
| Portland Cement Type 1 | | 100 | 100 | copolymeric foam stabilizers had (46% total solids).

EXAMPLES 68-74

Foamed Gypsum and Cement/Gypsum Mixtures

The following examples demonstrate the utility of the copolymeric foam stabilizer in preparing foamed gypsum and gypsum/cement blends having densities (measured) in the range of 0.24 to 0.27 g/cc.

A copolymeric foam stabilizer (Ex. 22) was partially neutralized to pH 7 using an aqueous solution of sodium hydroxide. The stabilizer was incorporated into gypsum (Example 69) and into gypsum/cement mixtures (Examples 70-74) as described above in Example 50. A control gypsum foam (Example 68) containing no copolymeric foam stabilizer hardened in less than one half an hour but the water uptake (24 hours) was 270%. Example 69 (gypsum foam stabilized with Example 22 copolymeric foam stabilizer) also hardened in less than one half an hour, but the water uptake (24 hours) was reduced to 190%. Examples 70-73 were foamed gypsum/cement mixtures containing from 9% to 33% cement in the total hydraulic composition.

These samples were found to harden in less than one half and hour, and the water uptake (24 hours) was further reduced to 130% to 80% respectively. Example 74 presents a foamed cement (no gypsum) composition containing the copolymeric foam stabilizer of Example 22. The composition hardened in greater than 2 hours and during this slow hardening process 25% foam collapse was evidenced. The water uptake was not measured.

TABLE XI

| | Examples | | | | | | |
|---|---|---|---|---|---|---|---|
| | 68 CNTRL | 69 | 70 | 71 | 72 | 73 | 74 |
| Component 1 | | | | | | | |
| Example 22 pH 7 | 0 | 1.5 | 1.6 | 1.6 | 1.6 | 1.6 | 1.6 |
| Siponate DS4 | 0.13 | 0.07 | 0.07 | 0.07 | 0.07 | 0.07 | 0.07 |
| Water | 18 | 14 | 14 | 14 | 14 | 14 | 14 |
| Component 2 | | | | | | | |
| Naphthalene sulfonate Polymer (43%) | 0 | 0.9 | 0.8 | 0.8 | 0.7 | 0.7 | 0.6 |
| Water | 67 | 60 | 54 | 52 | 49 | 47 | 37 |
| Portland Cement Type 1 | 0 | 0 | 9 | 17 | 23 | 33 | 100 |
| Gypsum (CaSO$_4$.H$_2$O) | 100 | 100 | 91 | 83 | 77 | 67 | 0 |

EXAMPLE 75

Preparation of Foamed Cementitious Roof Deck

A cementitious roof deck was made from the composition of this invention. Light weight (2.5-3.5 pounds per cubic foot) prefoam containing the copolymeric foam stabilizer of this invention (Example 22) was first made from a foam gun assembly. The foam gun assembly consists of three components. The first is a liquid delivery system with a motor and gear pump. The second is an air compressor which delivers fixed quantities of air under pressure. The third is a foam head with a liquid/air mixing chamber and an attached foam gun (1 ft. long with 1 inch inner diameter) packed with ceramic chips. During prefoam generation the compressed air and the prefoam liquid are thoroughly mixed in the liquid/air mixing chamber of the foam head. The air/liquid mixture is transformed into lightweight foam with fine bubbles after it is passed through the foam gun. Fixed quantity of prefoam is directly fed into a 4 cubic feet cement mortar mixer containing freshly prepared cement slurry from the Component Two of this invention. In each preparation a 94 lbs. bag of cement was used and foamed cement of 2–4 cubic foot was generated. The foamed cement was pumped up to an 18 feet high roof using a diaphragm pump. The diaphragm pump was operated by a 8 horse power air compressor. The foamed cement on the roof was properly sloped using a screening rubber paddle. One to three days after the cast of the foamed cement, the cementitious surface was covered with various waterproof materials, e.g., EPDM membrane.

EXAMPLE 76

Preparation of Foamed Cement Blocks and Panels with and without Fibers

Moulds in the shape of blocks and panels were made and lined inside with polypropylene films for mold release. Foamed cementitious composition of Example 53 was used. For the foamed cement containing fibers, 0.2 to 0.6% (based on the weight of cement) of ½ inch (1.27 cm) long polypropylene fibers from Fibermesh Company Chickamauga, Ga.) were added to the cementitious slurry before it was blended with the prefoam. The foamed cement blocks and panels were demolded after they were cured at room temperature for 2 to 4 days.

EXAMPLE 77

Preparation of Roof Tiles with and without Scrims

A rubber mould with an inside cavity in the shape of a roof tile has on one end an opening for feeding foamed cement. The mould was first split into half along its edge and the inside surface of both halves was sprayed with release reagent. Foamed cement prepared as in Example 76 was poured into the mould through its opening. The foamed tiles were demolded two days after they were cured at room temperature. For the preparation of tiles with scrims the two halves of the mould, after they were sprayed with release reagent, were brushed or sprayed with thin coat of unfoamed cementitious slurry. Glass fiber scrims were pressed on the inside of the mould and the wet cementitious coating acted as adhesive to hold the scrim in place. The two halves of the mould with the attached scrims were then closed and the foamed cement of this invention was fed through the opening of the mould. Two days after the casting, the foamed tiles with surface scrims were demolded. The scrim-covered tiles showed higher bending/flexural strength than their counterparts without scrims.

EXAMPLE 78

Preparation of Moldable or Formable Lightweight Tiles

The foamed cement based on the copolymeric foam stabilizer of Example 15 is usually very thick and rigid even before the cement hardens. Such firm texture of the foamed cement makes it moldable, extrudable or formable. A hard board with sawtooth type of edge which conforms with the contour of a roof tile was continuously dragged through the foamed cement such that the surface of the cement was shaped like the surface of a roof tile. After this, the cement was able to maintain the shape of the tile during hardening.

EXAMPLE 79

Preparation of Foamed Gypsum Blocks and Panels

Moulds in the shape of blocks and panels were made and lined inside with polypropylene films for mold release. The foamed gypsum of Example 69 was poured into the moulds and the hardened blocks and panels were demolded one to three hours after they were cast.

EXAMPLE 80

Preparation of Foamed Cementitious Flooring Over a Plywood Subfloor

Open boxes with dimensions of 4 feet × 4 feet × 4 inch were made from ¾ inch thick plywood. Foamed cement prepared according to Example 75, was poured into the wooden boxes directly from the cement mortar mixer. The cured foam showed good adhesion to the wooden surface underneath.

EXAMPLE 81

Preparation of Foamed Wall Coatings

A ¼ inch to ½ inch thick foamed cement incorporating the polymer of Example 15 was trowelled onto a vertical surface of a board made of insulative polystyrene foam. During the trowelling operation very little sagging of the foamed cement took place because of the thick texture of the foamed cement.

EXAMPLE 82

Foamed Gypsum as Landfill Cover

The foamed gypsum of Example 69 was evaluated for its ability to be used as landfill cover as follows. The foamed gypsum was prepared in less than about 2 minutes and a portion was poured into a paper cup. The gypsum was allowed tu cure while observing the hardness of the surface. Adequate surface hardness was achieved in less than 10 minutes.

The foamed gypsum cup was weighed. Water was slowly poured onto the foamed gypsum surface in the cup from an elevation of 4 feet for 1 minute, to simulate rainfall. The cup was reweighed and found not to absorb a significant amount of water, with the surface maintaining good hardness, which demonstrate that this material could be used as landfill cover.

What is claimed is:

1. A foamed hydraulic composition consisting essentially of at least one hydraulic substance and from about 25 to about 130 parts by weight water, and from about 0.01 to about 30 parts by weight of a copolymeric foam stabilizer, based on 100 parts hydraulic substance, wherein said copolymeric foam stabilizer is a copolymer formed from
   a) about 0.1% to about 98% by weight of one or more nonionic, ethylenically-unsaturated monomers and
   b) about 2% to about 40% by weight of one or more ionic or ionizable ethylenically-unsaturated monomers, at least one of said monomers containing carboxylic acid.

2. The composition of claim 1 further comprising from 0 to about 500 parts by weight of one or more ingredients selected from the group consisting of foaming agents, polymeric cement binders, fillers, aggregates, fibers, pigments, thickeners, cement accelerators, cement retarders and water reducers.

3. The composition of claim 1 wherein said copolymeric foam stabilizer further contains hydroxy functionality.

4. The composition of claim 1 wherein said copolymeric foam stabilizer contains greater than about 0.2 milliequivalent of carboxylic acid per solid gram of said copolymeric foam stabilizer.

5. The composition of claim 1 wherein said copolymeric foam stabilizer contains from about 0.3 to about 5.0 milliequivalents of carboxylic acid per solid gram of said copolymeric foam stabilizer.

6. The composition of claim 1 wherein said copolymeric foam stabilizer contains from about 0.7 to about 5.0 milliequivalents of carboxylic acid per solid gram of said copolymeric foam stabilizer.

7. The composition of claim 3 wherein said copolymeric foam stabilizer contains greater than 0.1 milliequivalent of hydroxy functionality per solid gram of said copolymeric foam stabilizer.

8. The composition of claim 1 wherein said copolymeric foam stabilizer is a multi-stage copolymer prepared by sequential emulsion polymerization.

9. The composition of claim 1 wherein said carboxylic acid-containing monomer is selected from the group consisting of acrylic acid, methacrylic acid, itaconic acid and maleic acid.

10. The composition of claim 2 further comprising from 0 to about 5 parts by weight of said water reducers, from 0 to about 10 parts by weight of said foaming agents, from 0 to about 400 parts by weight of said fillers, and from 0 to about 400 parts by weight of said aggregates.

11. The composition of claim 1 wherein said hydraulic substance is gypsum.

12. The composition of claim 1 wherein said hydraulic substance is cement.

13. The composition of claim 11 wherein said hydraulic substance further comprises cement.

14. The composition of claims 11, 12 or 13 wherein said composition further comprises a water reducer.

15. The composition of claim 1 wherein said composition is prepared by mixing component one with component two, wherein
a) said component one comprises a foamed mixture of water and said copolymeric foam stabilizer, and
b) said component two comprises water and one or more hydraulic substances.

16. The composition of claim 15 wherein said component one additionally comprises a foaming agent.

17. The composition of claim 15 wherein said component two additionally contains said copolymeric foam stabilizer.

18. The composition of claim 17 wherein said copolymeric foam stabilizer of component two is present in an amount from about 0.01 to less than about 30 parts by weight based on 100 parts by weight of said hydraulic substance.

19. The composition of claim 15 wherein said copolymer foam stabilizer has a weight average molecular weight greater than about 10,000.

20. The composition of claim 15 wherein said component one additionally comprises a polymeric cement binder.

21. The composition of claim 15 wherein said component two comprises at least one optional ingredient selected from the group consisting of polymeric cement binders, fillers, aggregates, fibers, pigments, thickeners, cement accelerators, cement retarders and water reducers.

22. The composition of claim 15 wherein said copolymeric foam stabilizer contains hydroxy functionality.

23. The composition of claim 22 wherein said copolymeric foam stabilizer contains greater than 0.1 milliequivalent of hydroxy per solid gram of said copolymeric foam stabilizer.

24. The composition of claim 22 wherein said copolymeric foam stabilizer contains from about 0.3 to about 5.0 milliequivalents of carboxylic acid per solid gram of said copolymeric foam stabilizer.

25. The composition of claim 15 wherein said carboxylic acid is selected from the group consisting of acrylic acid, methacrylic acid, itaconic acid and maleic acid.

26. The composition of claim 1 wherein said composition is prepared by mixing component one with component two, wherein a) said component one comprises a foamed mixture of water and one or more foaming agent, and b) said component two comprises water, one or more hydraulic substance and said copolymeric foam stabilizer.

27. The composition of claim 26 wherein said copolymeric stabilizer of component two is present in an amount from about 0.01 to about 30 parts by weight based on 100 parts by weight of said hydraulic substance.

28. The composition of claim 26 wherein said component one additionally comprises a copolymeric binder.

29. The composition of claim 26 wherein said component two comprises optional ingredients selected from the group consisting of polymeric cement binders, fillers, aggregates, fibers, pigments, thickeners, cement accelerators, cement retarders and water reducers.

30. The composition of claim 26 wherein said copolymeric foam stabilizer contains hydroxy functionality.

31. The composition of claim 26 wherein said copolymeric foam stabilizer contains greater than 0.1 milliequivalent of hydroxy per solid gram of said copolymeric foam stabilizer.

32. The method for use of said copolymer of claim 1 as a foam stabilizer.

33. A floor substrate comprising the composition of claim 1.

34. A roof substrate comprising the composition of claim 1.

35. A wall substrate comprising the composition of claim 1.

36. A landfill cover comprising the foamed gypsum composition of claim 11.

* * * * *